(12) United States Patent
Tame

(10) Patent No.: US 6,902,236 B2
(45) Date of Patent: Jun. 7, 2005

(54) SEAT ASSEMBLY WITH DISPLACEABLE SEAT BACK RECLINER PIVOT

(75) Inventor: Omar D. Tame, West Bloomfield, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 10/451,046

(22) PCT Filed: Dec. 20, 2001

(86) PCT No.: PCT/US01/50868
§ 371 (c)(1),
(2), (4) Date: Oct. 29, 2003

(87) PCT Pub. No.: WO02/055333
PCT Pub. Date: Jul. 18, 2002

(65) Prior Publication Data
US 2004/0061371 A1 Apr. 1, 2004

Related U.S. Application Data
(60) Provisional application No. 60/257,319, filed on Dec. 20, 2000.

(51) Int. Cl.⁷ .................................................. B60N 2/30
(52) U.S. Cl. ........................ 297/335; 297/331; 297/367; 297/378.12
(58) Field of Search ............................... 297/331, 334, 297/335, 367, 378.12

(56) References Cited

U.S. PATENT DOCUMENTS

| | | | |
|---|---|---|---|
| 2,620,020 A | * 12/1952 | Austin | 297/340 |
| 3,957,312 A | 5/1976 | Bonnaud | |
| 4,475,769 A | 10/1984 | Crawford et al. | |
| 4,695,094 A | 9/1987 | Siebler | |
| 4,805,953 A | 2/1989 | Yamauchi | |
| 5,482,349 A | 1/1996 | Richter et al. | |
| 5,570,931 A | 11/1996 | Kargilis et al. | |
| 5,588,707 A | 12/1996 | Bolsworth et al. | |
| 5,934,732 A | 8/1999 | Jakubiec | |
| 5,997,090 A | 12/1999 | Baloche et al. | |
| 6,520,581 B1 | * 2/2003 | Tame | 297/336 |
| 2004/0113410 A1 | * 6/2004 | Morino et al. | 280/808 |

FOREIGN PATENT DOCUMENTS

| | | |
|---|---|---|
| EP | 0 211 248 | 4/1986 |
| FR | 2 524 285 | 4/1983 |
| JP | 2001-30812 | 2/2001 |

* cited by examiner

Primary Examiner—Peter M. Cuomo
Assistant Examiner—Joseph Edell
(74) Attorney, Agent, or Firm—Clark Hill PLC

(57) ABSTRACT

A seat assembly having a seat back (11), a generally horizontal seat cushion (14), and a recliner mechanism (20) allowing for pivotal adjustment of the seat back about a first pivot axis (21) relative to the seat cushion and displacement of the first pivot axis about a second pivot axis (22) between forward and rearward positions. With the first pivot axis (21) in the forward position, the seat back is adjustable about the first pivot axis (21) between a plurality of reclined seating positions. With the first pivot axis in the rearward position, the seat back is adjustable about the first pivot axis between one of the reclined seating positions and a stowed position generally aligned against the seat cushion. The seat cushion is pivotally adjustable about a four bar linkage (17, 18) between a seating position and a stowed position. A link (80) interconnects the seat back and the seat cushion allowing movement of both the seat back and the seat cushion together between the respective seating and stowed positions.

5 Claims, 4 Drawing Sheets

_US 6,902,236 B2_

SEAT ASSEMBLY WITH DISPLACEABLE SEAT BACK RECLINER PIVOT

RELATED APPLICATION

This application claims priority to and all the benefits of U.S. Provisional Application No. 60/257,319, filed on Dec. 20, 2000.

BACKGROUND OF THE INVENTION

1. Field of the Invention

The subject invention relates to a seat assembly for an automotive vehicle, and more particularly, to a recliner mechanism operatively interconnecting a seat back to a seat cushion for pivotal movement of the seat back relative to the seat cushion about a pivot axis that is displaceable between a seating position and a forwardly stowed position.

2. Description of the Prior Art

Automotive vehicles include seat assemblies for supporting occupants within the vehicle. Automotive vehicles, particularly sport utility vehicles or vans, have cargo storage areas located behind two or several rows of seat assemblies. Typically, the cargo storage area has a generally horizontal load floor spanning the width of the vehicle and extending between an adjacent row of seat assemblies and a rear tailgate.

The seat assemblies each comprise a seat cushion and a seat back. The seat back has a front surface for supporting the occupant and an opposite rear surface. Typically, the seat back is pivotally interconnected to the seat cushion by a recliner mechanism. The recliner mechanism allows pivotal adjustment of the seat back relative to the seat cushion between a plurality of reclined positions about a fixed, single pivot axis. It is also common for the recliner mechanism to allow movement of the seat back between one of the reclined seating positions and a stowed position against the seat cushion to extend the cargo carrying capacity of the vehicle. With the seat back in the stowed position, the rear surface of the seat back forms a generally continuous load-carrying surface with the load floor of the cargo storage area. An example of such a mechanism is found in U.S. Pat. No. 5,482,349 which issued to Richter et al. on Jan. 9, 1996.

Usually, it is desirable for the load-carrying surface to be as flat and as low as possible in the vehicle in order to maximize the cargo carrying capacity of the vehicle. Additionally, obstructions within the vehicle, such as a dashboard or another seat assembly, interfere with the seat back as it pivots between one of the reclined seating positions and the stowed position about a fixed pivot axis.

Therefore, it remains desirable to provide a recliner mechanism that allows pivotal movement of the seat back between the plurality of reclined seating positions, and further, allows displacement of the pivot axis between forward and rearward positions during movement of the seat back between one of the reclined seating positions and the stowed position.

SUMMARY OF THE INVENTION

This invention relates to a seat assembly for use in an automotive vehicle comprising a seat cushion, a seat back, and a recliner mechanism. The recliner mechanism operatively interconnects the seat back to the vehicle allowing pivotal movement of the seat back relative to the seat cushion about a first pivot axis, and further, allows fore and aft displacement of the seat back about a second pivot axis between a forward position and a rearward position relative to the seat cushion.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a side view of the seat assembly in a stowed position and.

DETAILED DESCRIPTION OF THE PREFERRED EMBODIMENT

Figure 1:
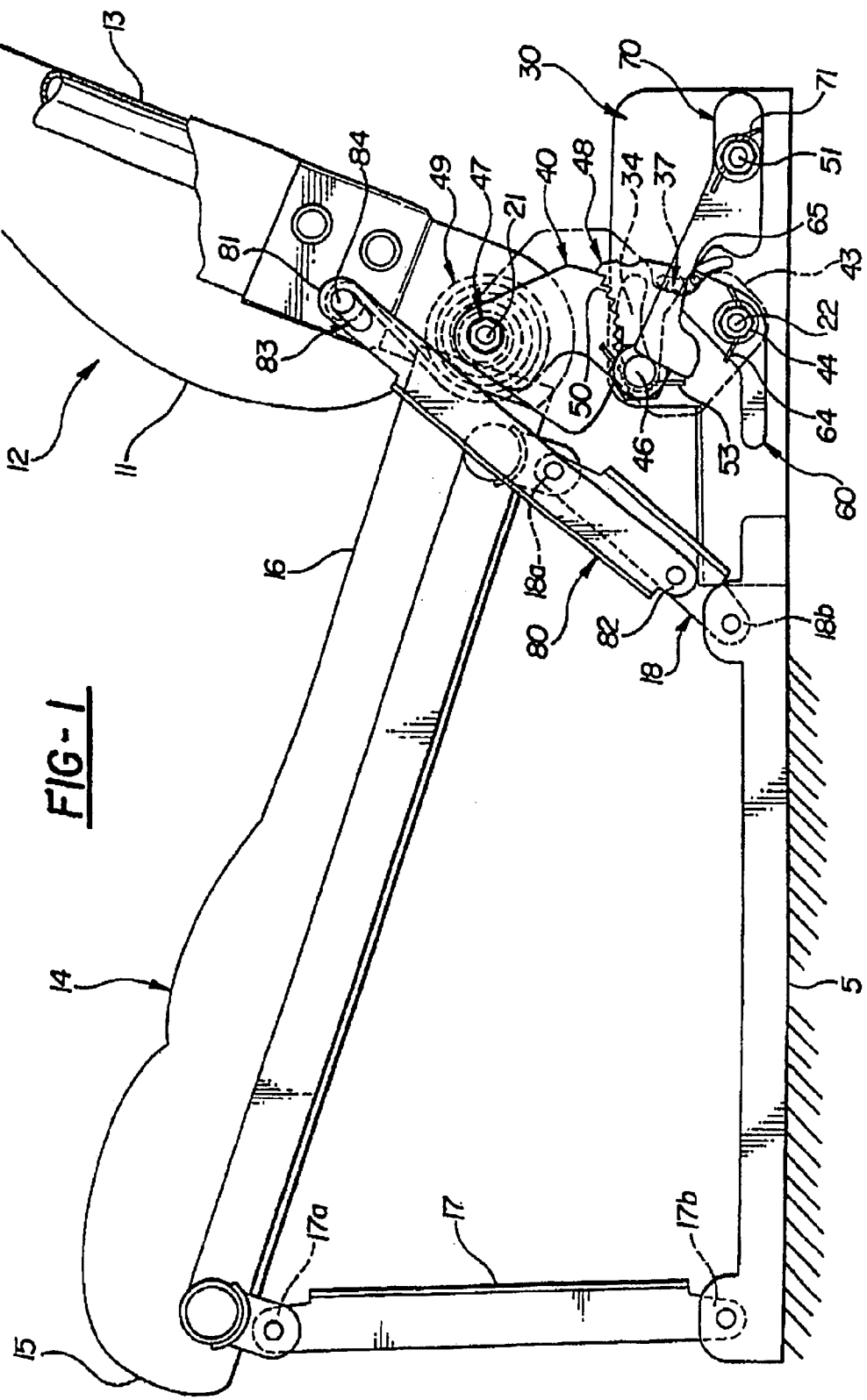
FIG. 1 is a side view of an automotive seat assembly in a seating position incorporating a recliner mechanism having a displaceable pivot according to one embodiment of the invention; of the invention
Figure 1A:
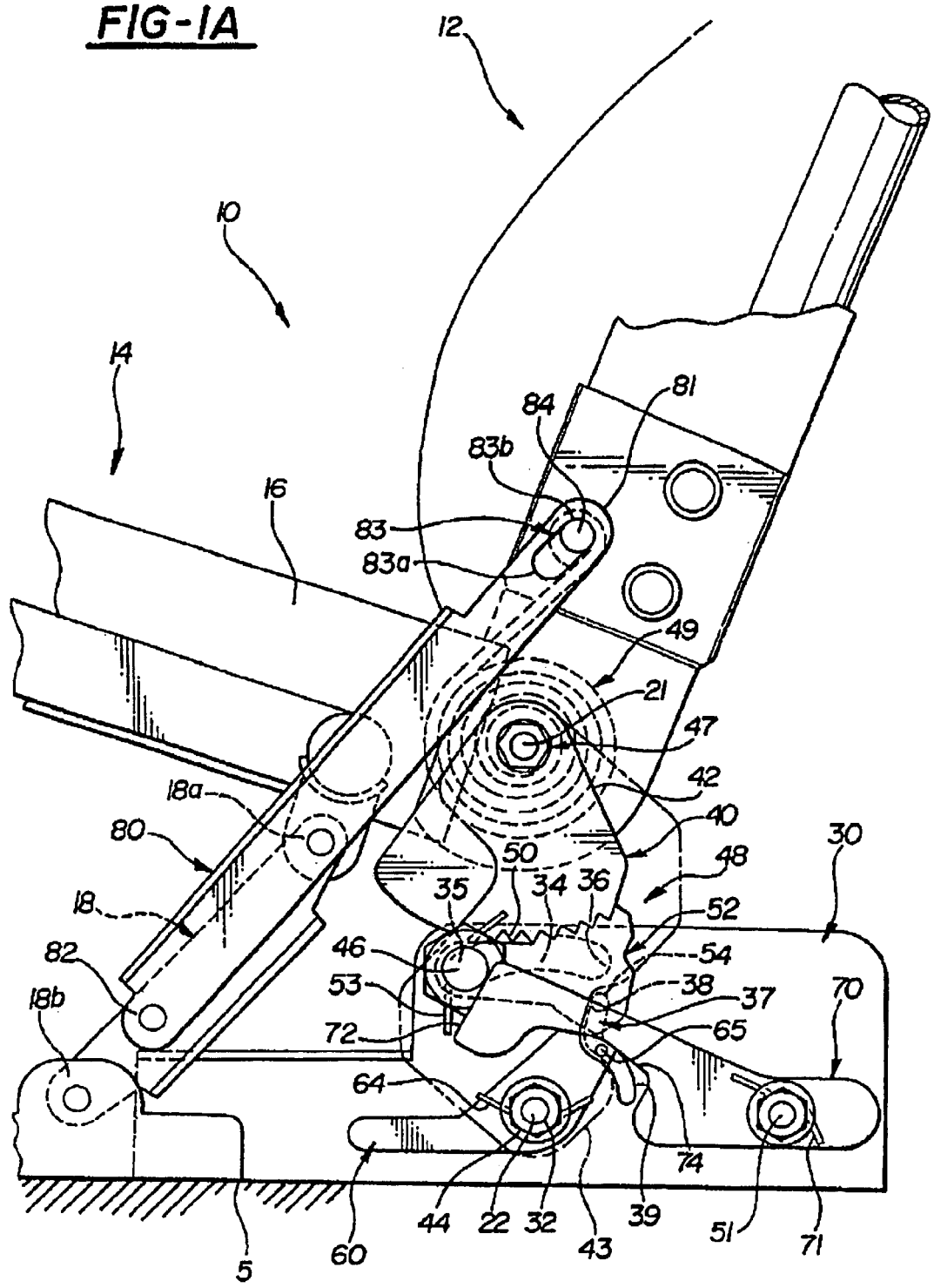
FIG. 1A is an enlarged side view of the seat assembly in the seating position.
Figure 2:
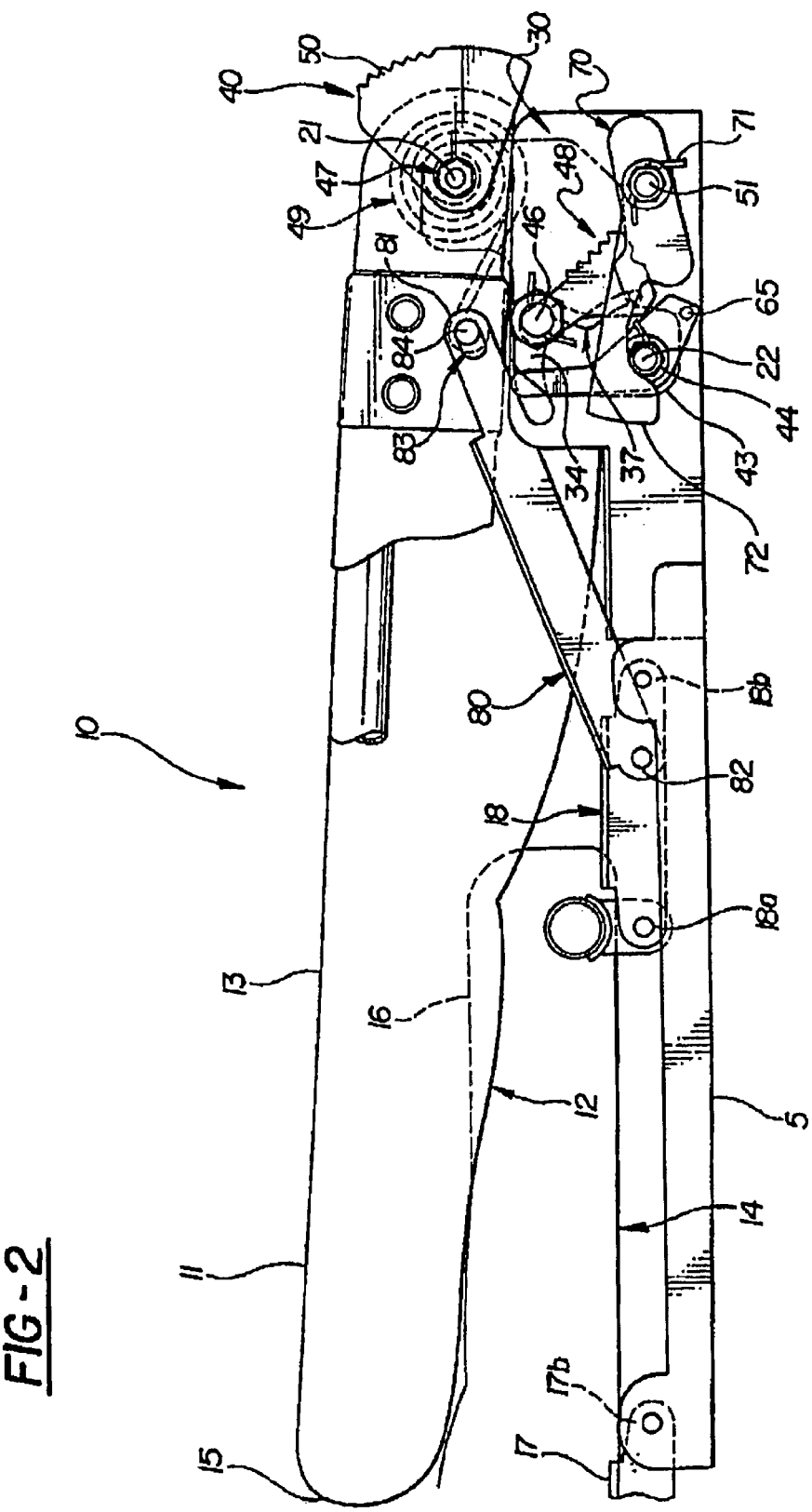
Figure 2A:
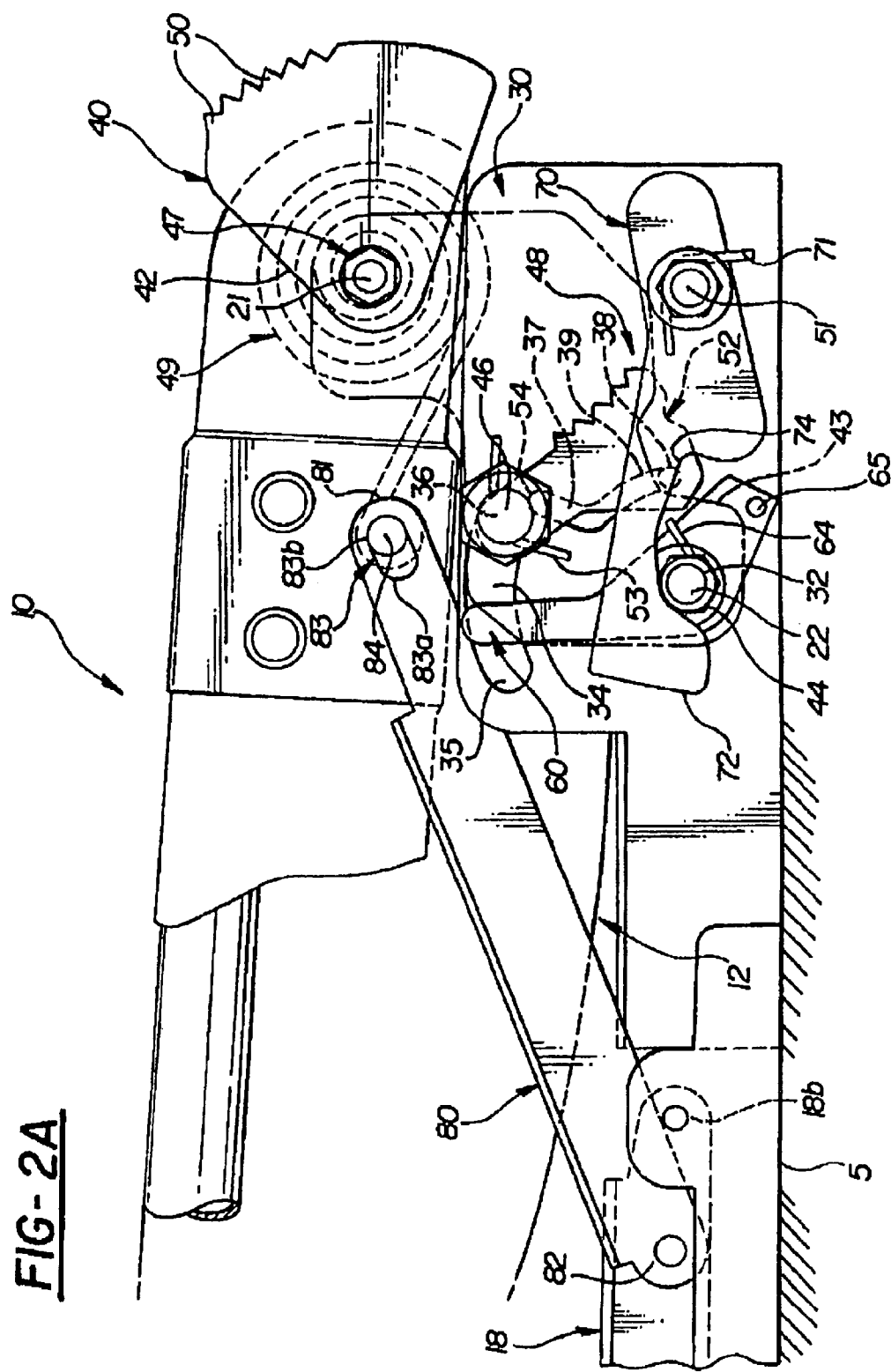
FIG. 2A is an enlarged view of the seat assembly in then stowed position.

Referring to the figures, FIGS. 1 and 1A discloses a seat assembly 10 for supporting an occupant above a vehicle floor 5. The seat assembly 10 comprises a generally horizontal seat cushion 14 and a generally upright seat back 11. The seat back 11 has a front surface 12 for supporting the occupant's torso and an opposite rear surface 13. The seat cushion 14 has opposite front and rear ends 15, 16. A pair of parallel and spaced apart front legs 17 each extends between opposite terminal ends 17a and 17b pivotally assembled to the front end 15 of the seat cushion 14 and the vehicle floor 5, respectively. Similarly, a pair of parallel and spaced apart rear legs 18 extends between opposite terminal ends 18a and 18b pivotally assembled to the rear end 16 of the seat cushion 14 and the vehicle floor 5, respectively. The front and rear legs 17, 18 together form a four-bar linkage mechanism that allows the seat cushion 14 to move between a seating position spaced above the vehicle floor 5, as shown in FIGS. 1, and 1A and a stowed position against the vehicle floor 5, as shown in FIGS. 2 and 2A.

A recliner assembly 20 interconnects the seat back 11 to the vehicle floor 5 allowing pivotal adjustment of the seat back 11 about an upper pivot axis 21. Described in greater detail below, the upper pivot axis 21 is displaceable about a lower pivot axis 22 between a forward position, shown in FIGS. 1 and 1A, and a lower, rearward position, shown in FIGS. 2 and 2A. When the upper pivot axis 21 is in the forward position, the seat back 11 is adjustable between a full-forward reclined seating position and a full-rearward reclined seating position and a plurality of reclined seating positions therebetween. When the upper pivot axis 21 is in the rear position, the seat back 11 is adjustable between any one of the reclined seating positions and a stowed position aligned longitudinally with the seat cushion 14, as shown in FIG. 2. In the stowed position, the rear surface 13 of the seat back 11 is generally horizontal. Displacement of the upper pivot axis 21 towards the rearward position allows the seat back 11 to clear obstructions in front of the seat assembly 10, such as another seat assembly or dashboard, as the seat back 11 is tilted towards the stowed position.

The recliner assembly 20 includes a floor bracket 30 fixedly secured to the vehicle floor 5 by bolting or any other suitable means. The floor bracket 30 extends vertically upwardly from the vehicle floor 5 adjacent to the rearward end 16 of the seat cushion 14. A pivot bore 32 is formed in the floor bracket 30. An arcuate first guide slot 34 is formed in the floor bracket 30 spaced apart from the pivot bore 32 by a fixed radial distance. The first guide slot 34 extends between forward and rearward ends 35, 36. A V-shaped second guide slot 37 extending between upper and lower portions 38, 39 is formed in the floor bracket 30. The second guide slot 37 is disposed generally vertically between the first guide slot 34 and the pivot bore 32. The upper portion 38 of the second guide slot 37 is arcuate and centered generally about the forward end 35 of the first guide slot 34. The lower portion 39 of the second guide slot 37 is arcuate and centered about the pivot bore 32.

The recliner assembly 20 further comprises a seat back bracket 40 extending between an upper end 42 and an opposite lower end 43. A first pivot pin 44 defining the lower pivot axis 22 extends axially from the lower end 43 of the seat back bracket 40 and through the pivot bore 32 in the floor bracket 30. A first guide pin 46 extends from the seat back bracket 40 through the first guide slot 34 of the floor bracket 30. The first guide pin 46 slides within the first guide slot 34 as the seat back bracket 40 pivots about the first pivot pin 44. The first guide slot 34 limits the pivotal motion of the seat back bracket 40 about the first pivot pin 44. The forward and rearward ends 35, 36 of the first guide slot 34 define the forward and rearward positions, respectively, of the upper pivot axis 21. Alternatively, pivot stops could be formed in or secured to the floor bracket 30 to limit the pivotal motion of the seat back bracket 40 between the forward and rearward positions instead of the first guide slot 34.

A second pivot pin 47 defining the upper pivot axis 21 pivotally interconnects the seat back 11 to the upper end 42 of the seat back bracket 40. A biasing member 49 biases the seat back 11 in a counterclockwise direction, as viewed in FIGS. 1 and 2, towards the stowed position about the second pivot pin 47. The recliner assembly 20 further includes a locking mechanism 48 having a sector of gear teeth 50 extending radially from the seat back 11 and centered about the second pivot pin 47. The locking mechanism 48 also includes a pawl 52 adapted for locking engagement with the gear teeth 50 and moveable into and out of locking engagement with the gear teeth 50 about a first guide pin 46. Rotation of the seat back 11 relative to the seat back bracket 40 is constrained by the locking engagement of the pawl 52 with the gear teeth 50. A biasing member 53 biases the pawl 52 in a clockwise direction, as viewed in FIG. 1, away from the gear teeth 50. Further, a second guide pin 54 extends from the pawl 52 through the second guide slot 37.

A recline lever 60 pivotally mounted to the first pivot pin 44 actuates the locking mechanism 48. More specifically, the recline lever 60 has a cam portion 62 engagable with the pawl 52, wherein the pawl 52 is held in meshing engagement with the gear teeth 50. A biasing member 64 extends between the recline lever 60 and the floor bracket 30 for maintaining engagement of the cam portion 62 with the pawl 52. With the cam portion 62 engaged with the pawl 52, forces applied to the seat back 11 are transferred radially through the first pivot pin 44. The spring rate of the biasing member 64 is at least sufficient to overcome the force applied by the biasing member 53 on the pawl 52. A pin 65 extends axially outwardly from the cam portion 62 allowing the recliner lever to be remotely actuated, which is described below.

A dump lever 70 is pivotally assembled to the floor bracket 30 by a pivot pin 51. The dump lever 70 includes a stop surface 72 engagable with the first guide pin 46. The dump lever 70 is biased in a clockwise direction, as viewed in FIG. 1, by a biasing member 71 so that the stop surface 72 is generally normal to the swing path of the upper pivot axis 21. The stop surface 72 maintains the first guide pin 46 against the forward end 35 of the first guide slot 34. The dump lever 70 further includes a cam surface 74 for engaging the pin 65 of the recline lever 60.

A link arm 80 extends between an upper end 81 pivotally assembled to the seat back 11 and a lower end 82 pivotally assembled to one of the rear legs 18 to synchronize movement of the seat back 11 and the seat cushion 14. A third guide slot 83 extending between first and second ends 83a, 83b is formed in the upper end 81 of the link arm 80. A third guide pin 84 extends axially from the seat back 11 through the third guide slot 83 of the link arm 80. By this arrangement, the seat cushion 14 is moved between the seating position and the stowed position in response to pivotal movement of the seat back 11 between any one of the reclined seating positions and the stowed position, respectively. However, pivotal movement of the seat back 11 between the full-forward and full-rearward reclined seating positions is not transferred through the link arm 80 to the seat cushion 12 as the third guide pin 84 slides between the first and second ends 83a, 83b of the third guide slot 83, respectively.

In operation, the angular position of the seat back 11 is adjusted by first rotating the recline lever 60 clockwise from the position shown in FIG. 1. The cam portion 62 slides past the pawl 52. The biasing member 53 urges the pawl 52 out of locking engagement with the gear teeth 50, so that the seat back 12 is freely adjustable. The second guide pin 54 of the pawl 52 slides within the upper portion 38 of the second guide slot 37 towards the lower portion 39. Once the seat back 11 has been adjusted to a desired reclined seating position, the user releases the recline lever 60. The recline lever 60 rotates counterclockwise under the force of the biasing member 64. The cam portion 62 of the recline lever 60 forces the pawl 52 to rotate counterclockwise against the force of the biasing member 52. The pawl 52 returns into locking engagement with the gear teeth 50, thereby maintaining the seat back 11 in the desired reclined seating position.

To adjust the seat back 11 and the seat cushion 14 to the respective stowed positions, the dump lever 70 is first rotated counterclockwise against the force of the biasing member 71. The stop surface 72 clears the swing path of the first guide pin 46 to allow the seat back bracket 40 to pivot about the first pivot pin 44. The cam surface 74 of the dump lever 70 applies force to the pin 65, thereby causing the recline lever 60 to pivot clockwise. Thus, the recline lever 60 pivots clockwise in response to the counterclockwise motion of the dump lever 70. The cam portion 62 of the recline lever 60 slides past the pawl 52 allowing the biasing member 53 to move the pawl 52 clockwise out of locking engagement with the gear teeth 50. The second guide pin 54 slides within the upper portion 38 of the second guide slot 37 towards the lower portion 39. The biasing member 49 causes the seat back 11 to pivot towards the stowed position. The third guide pin 84 slides towards the second end 83b of the third guide slot 83. Upon reaching the second end 83b, the third guide pin 84 transfers the counterclockwise motion of the seat back 11 to the rear leg 18 causing the seat cushion 14 to move forwardly toward the stowed position. Thus, the seat back 11 and the seat cushion 14 move together towards the respective stowed positions. The seat back bracket 40 is forced to pivot clockwise about the lower pivot axis and the first guide pin 46 slides within the first guide slot 34 towards the rearward end 36. As the first guide pin 46 approaches the rearward end 36, the lower portion 39 of the second guide slot 37 acts upon the second guide pin 54 to force the pawl 52 further clockwise to ensure clearance with the gear teeth 50. Once the first guide pin 46 reaches the rearward end 36, the seat back 11 and the seat cushion 14 are in the respective stowed positions. With the seat back 11 in the stowed position, the rear surface 13 can be used to support cargo.

The seat back 11 can be returned to the full-rear reclined seating position by pivoting the seat back 11 clockwise, as viewed in FIG. 2, against the force of the biasing member 49. The third guide pin 84 slides towards the first end 83a of the third guide slot 83. Upon reaching the first end 83a, the third guide pin 84 pulls the rear leg 18 as the seat back 11 continues its clockwise motion. The seat cushion 12 then moves rearwardly towards its seating position in response to the continued clockwise motion of the seat back 11. Once the seat cushion 12 returns to the seating position and as the seat back 11 approaches the full-rear reclined seating position, the seat back bracket 40 is pulled in a counterclockwise direction by the seat back 11. The lower portion 39 of the guide slot 37 holds the pawl 52 out of engagement with the gear teeth 50 to allow the seat back 11 to continue its swing towards the full-rear reclined seating position. Once the first guide pin 46 reaches the forward end 35 of the first guide slot 34, the second guide pin 54 on the pawl 52 slides out of the lower portion 39 and into the upper portion 38 of the second guide slot 37. As the biasing member 64 pulls the recline lever 60 in a counterclockwise direction, the cam portion 62 pushes the pawl 52 back into engagement with the gear teeth 50 to lock the seat back 11 in the full-rear reclined seating position. The biasing member 71 rotates the dump lever 70 counterclockwise until the stop surface 72 rests against the first guide pin 46 to maintain the first guide pin 46 against the forward end 35 of the first guide slot 34.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly for supporting an occupant above a floor of an automotive vehicle, said seat assembly comprising:

a seat cushion;

a plurality of legs each extending between one terminal end pivotally assembled to said seat cushion and an opposite terminal end adapted to be pivotally assembled to the floor for allowing movement of said seat cushion between a seating position spaced above the floor and a stowed position supported upon the floor;

a seat back;

a recliner assembly operatively coupled to said seat back for providing pivotal movement of said seat back relative to said seat cushion about a first pivot axis, and further allowing fore and aft displacement of said seat back about a second pivot axis between a forward position and a rearward position relative to said seat cushion;

a locking mechanism coupled to said seat back for selectively locking said seat back between a plurality of reclined seating positions about said first pivot axis and further allowing said seat back to move between said plurality of reclined seating positions and a stowed position aligned longitudinally with said seat cushion;

a link interconnecting said seat back and at least one of said plurality of legs for moving said seat cushion between said seating position and said stowed position in response to movement of said seat back between said plurality of reclined seating positions and said stowed position, respectively;

wherein said locking mechanism includes a floor bracket adapted to be fixedly mounted to the floor, a seat back bracket extending between an upper end pivotally assembled to said seat back for movement of said seat back about said first pivot axis and a lower end pivotally assembled to said floor bracket for movement of said seat back bracket about said second pivot axis between said forward and rearward positions, a sector of teeth extending from said seat back, and a pawl locking engagable with said sector of teeth to prevent pivotal movement of said seat back relative to said seat cushion and pivotally assembled to said seat back bracket for movement in and out of locking engagement with said sector of teeth;

said floor bracket including a first guide slot extending between a forward end and a rearward end and adapted for sliding engagement with said seat back bracket whereby said seat back is moveable between said forward and rearward position and a second guide slot slidably engaged with said pawl, said second guide slot extending between an upper portion for guiding said pawl in and out of engagement with said sector of teeth and an arcuate lower portion centered about said first pivot axis for guiding said pawl away from said sector of teeth during movement of said seat back between said plurality of reclined seating positions and said stowed position.

2. A seat assembly as set forth in claim 1 wherein said seat back bracket includes a first guide pin extending axially therefrom for sliding engagement within said first guide slot, wherein said seat back is movable between said forward position and said rearward position.

3. A seat assembly as set forth in claim 2 wherein said pawl includes a second guide pin extending axially therefrom slidably engaged with said second guide slot for urging said pawl in and out of engagement with said sector of gear teeth during movement of said seat back between said plurality of reclined seating positions and said stowed position.

4. A seat assembly as set forth in claim 1 wherein said seat back includes a third guide pin extending axially therefrom for pivotally interconnecting said seat back and upper end of said link.

5. A seat assembly as set forth in claim 4 wherein an upper end of said link includes a third guide slot slidably engaged with said third guide pin for movement of said third guide pin therein during movement of said seat back between said plurality of reclined seating positions, wherein said seat cushion remains in said seating position.

* * * * *